Figure 2:
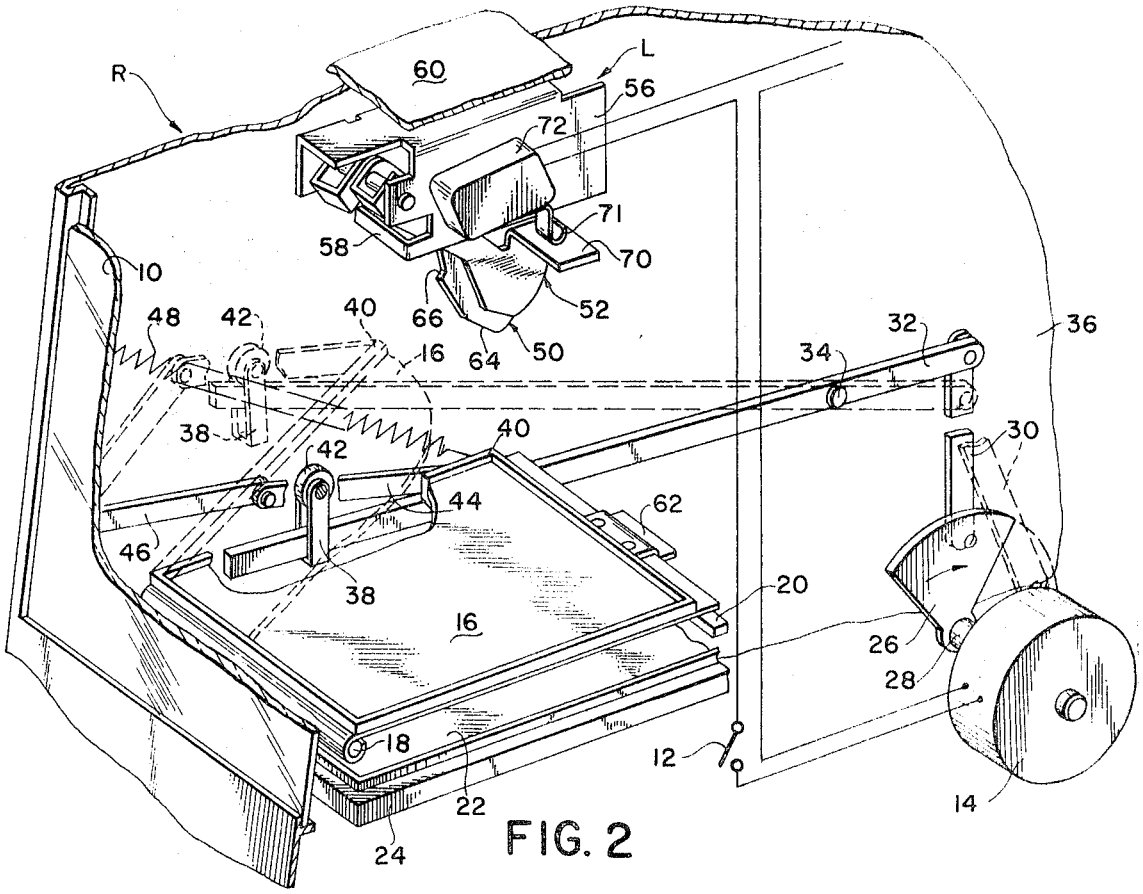
Figure 1:
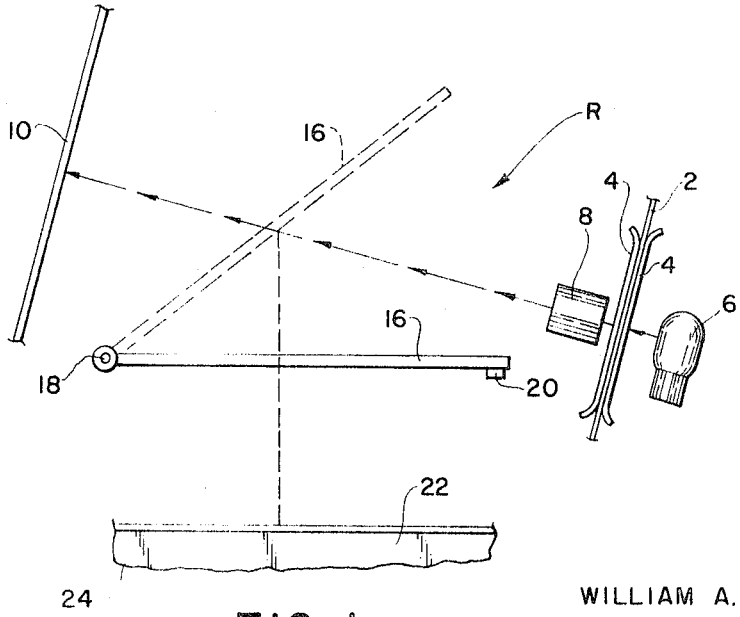
Figure 3:
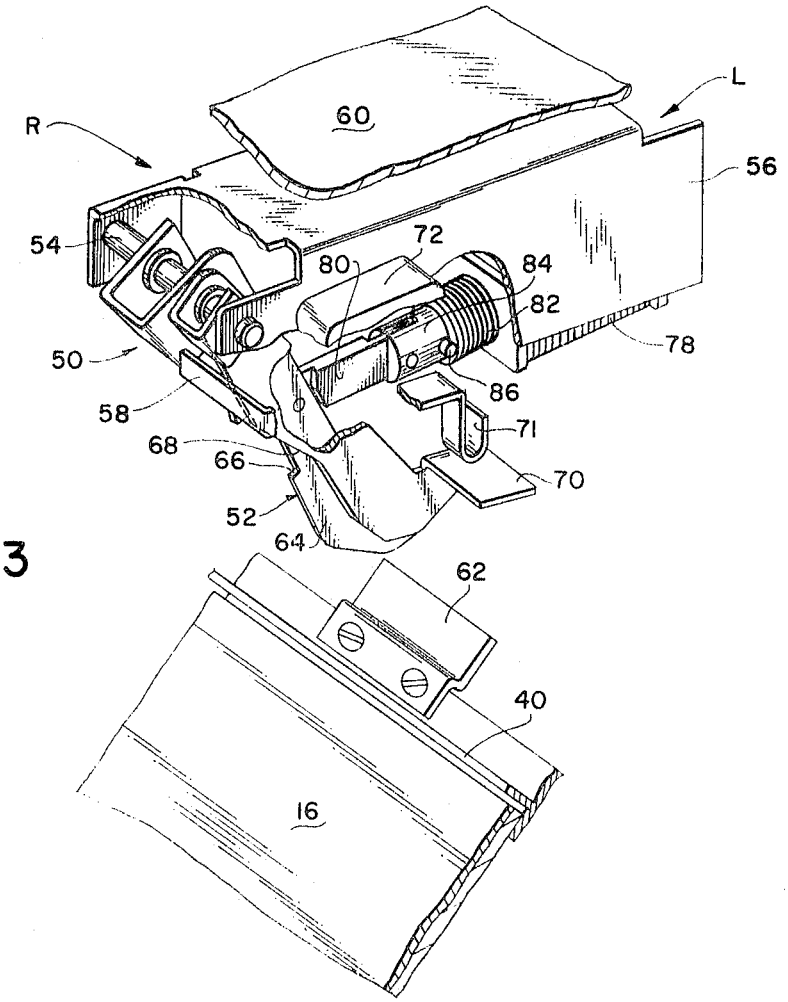
Figure 4:
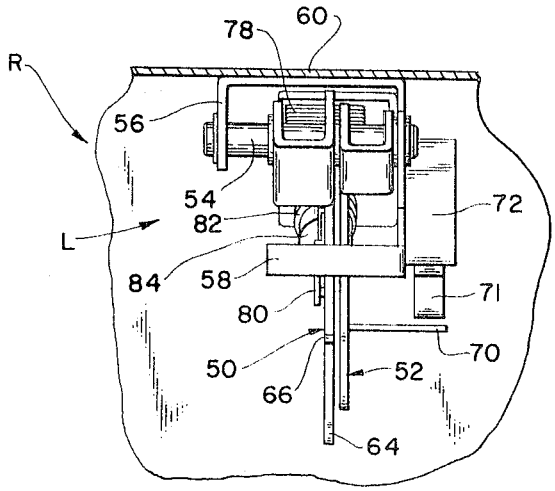
Figure 5:
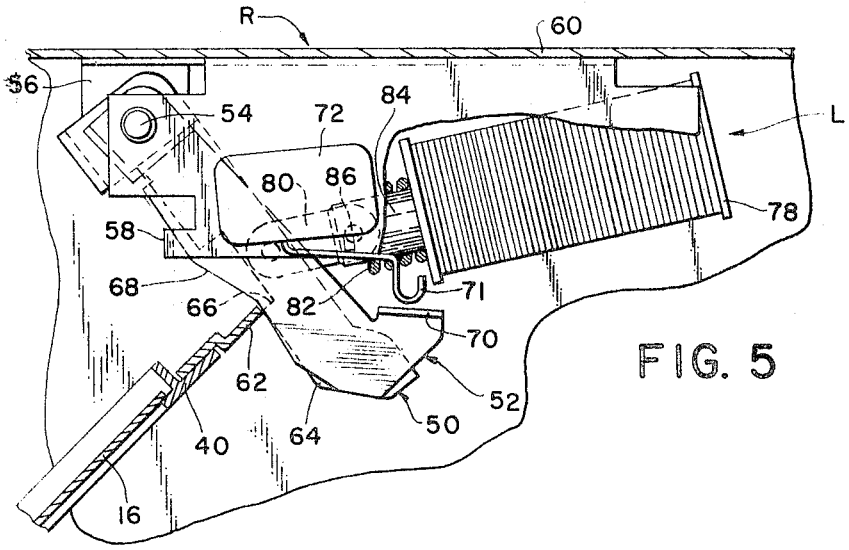
Figure 6:
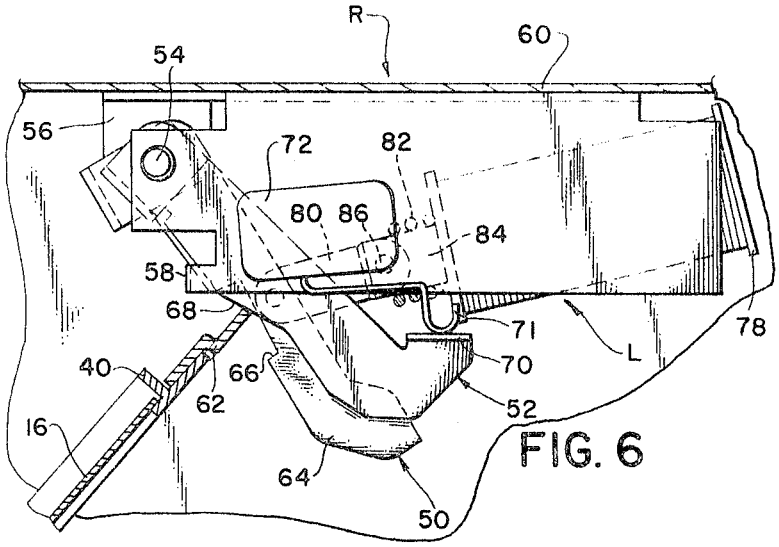
Figure 7:
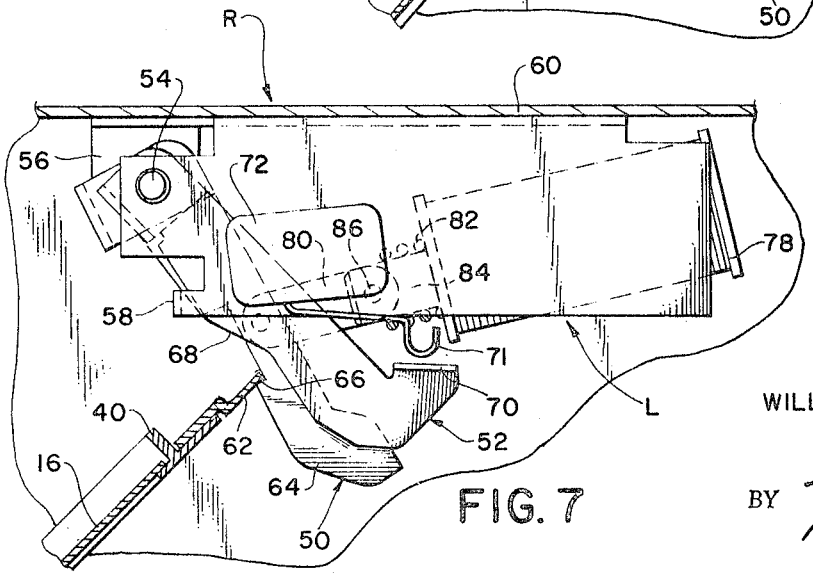

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 705

T888,008
POSITIONING MECHANISM
William A. MacDonald, Jr., 901 Elmgrove Road, Rochester, N.Y. 14650
Filed Nov. 9, 1970, Ser. No. 88,032
**Int. Cl. G03b *27/70***
U.S. Cl. 355—45
3 Sheets Drawing. 10 Pages Specification

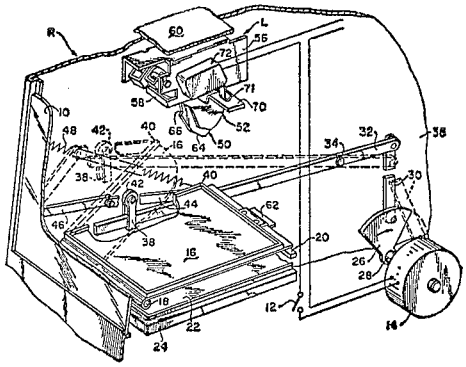

A latch mechanism is provided for supporting a pivotal mirror in a raised position in the optical path of a reader-printer to deflect a projected image from a primary path to a secondary path. The latch mechanism includes a latch lever adjacent a switch lever which is operated by movement of the mirror through suitable drive means so that the mirror is moved past the latch lever before it engages the switch lever to shut off power to the motor. After power is shut off the mirror moves in the reverse direction under the influence of gravity against the latch lever which holds the mirror in a fixed, predetermined position which is not affected by the amount the drive motor coasts after it is de-energized or by part tolerances.

July 20, 1971 W. A. MacDONALD, JR T888,008

POSITIONING MECHANISM

Filed Dec. 9, 1970 3 Sheets-Sheet 1

WILLIAM A. MacDONALD, JR
INVENTOR.

BY Gary D. Fields
Robert W. Hampton

ATTORNEYS

POSITIONING MECHANISM

Filed Dec. 9, 1970 3 Sheets-Sheet 2

WILLIAM A. MacDONALD, JR.
INVENTOR.

BY Gary D. Fields
Robert W. Hampton

ATTORNEYS

July 20, 1971 W. A. MacDONALD, JR T888,008

POSITIONING MECHANISM

Filed Dec. 9, 1970 3 Sheets-Sheet 3

WILLIAM A. MacDONALD, JR.
INVENTOR.

BY Gary D. Fields
Robert W. Hampton

ATTORNEYS